June 27, 1961
H. COLE
2,990,217
DOUGH DUSTING EQUIPMENT
Filed June 16, 1958
3 Sheets-Sheet 1
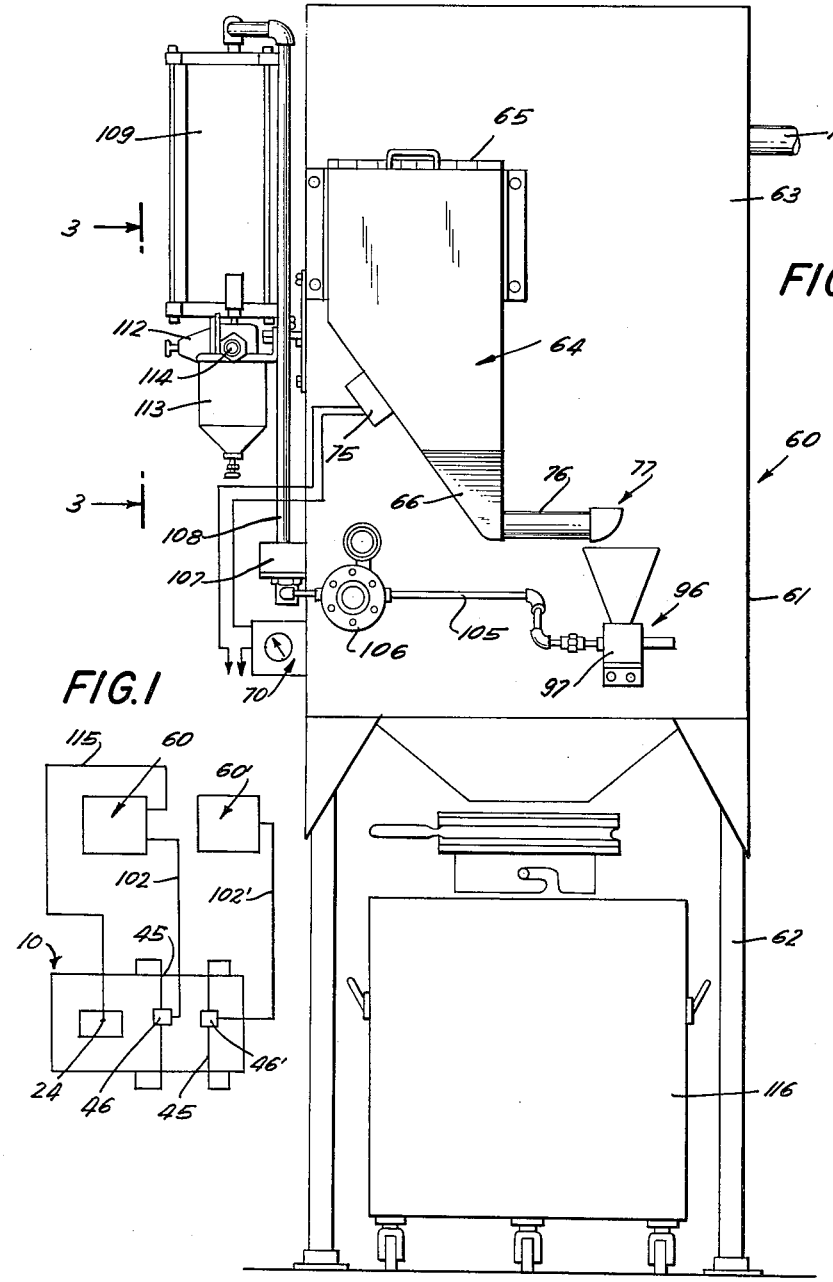
FIG. 2
FIG. 1
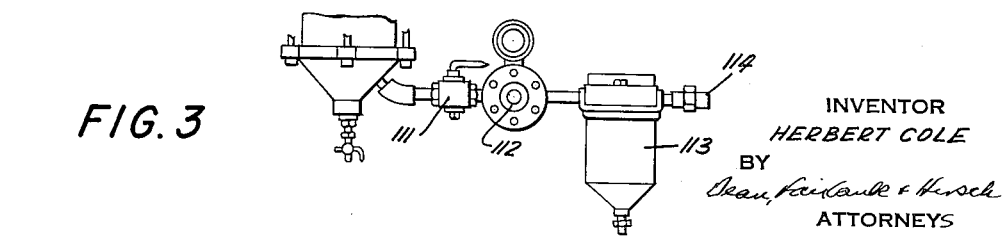
FIG. 3
INVENTOR
HERBERT COLE
BY
ATTORNEYS June 27, 1961  H. COLE  2,990,217
DOUGH DUSTING EQUIPMENT
Filed June 16, 1958  3 Sheets-Sheet 2
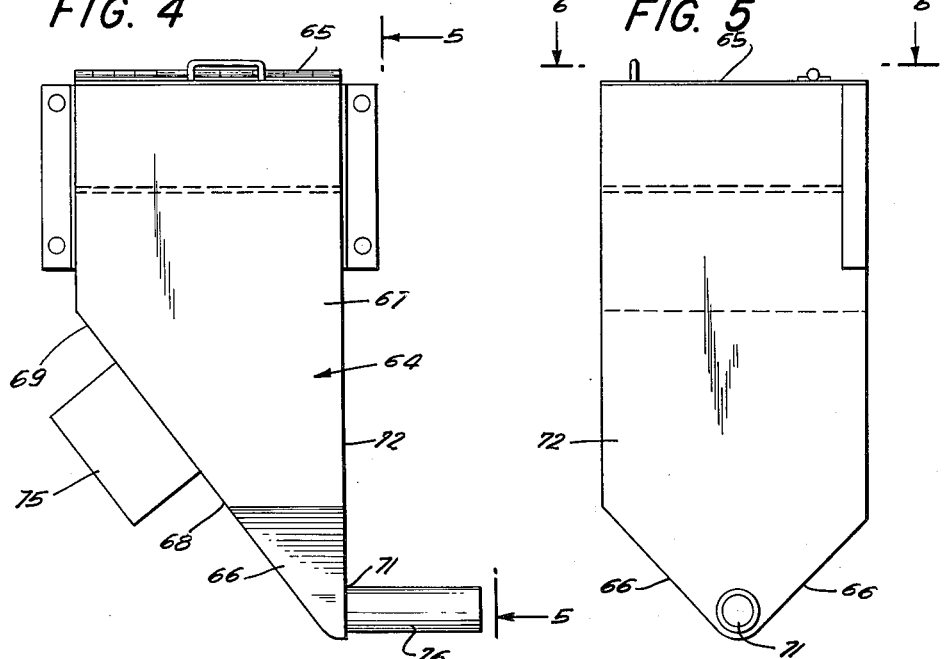
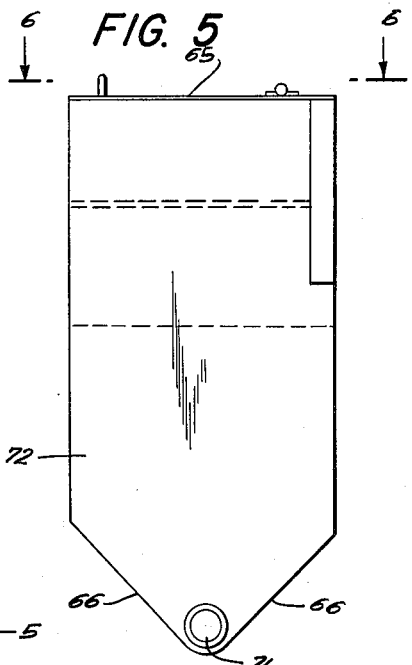
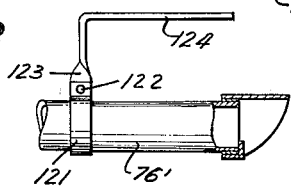
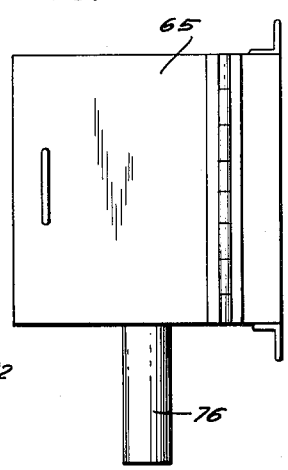
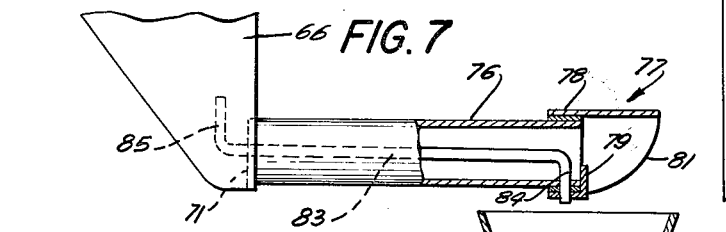
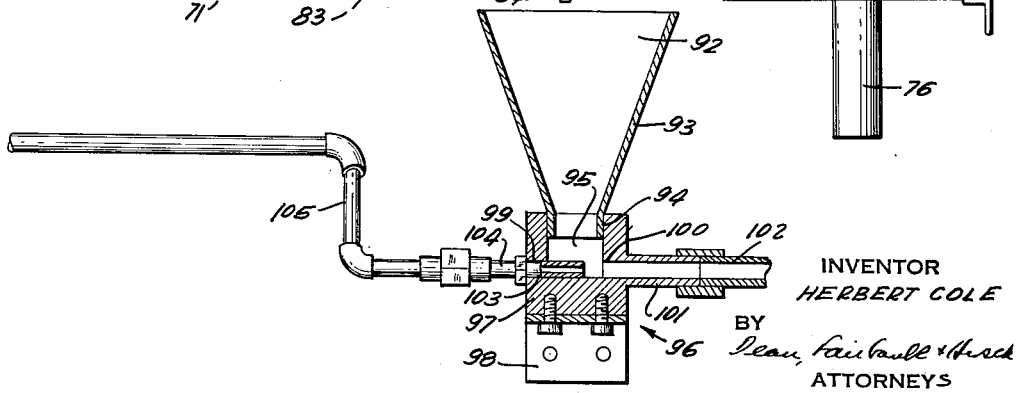
INVENTOR
HERBERT COLE
BY
ATTORNEYS

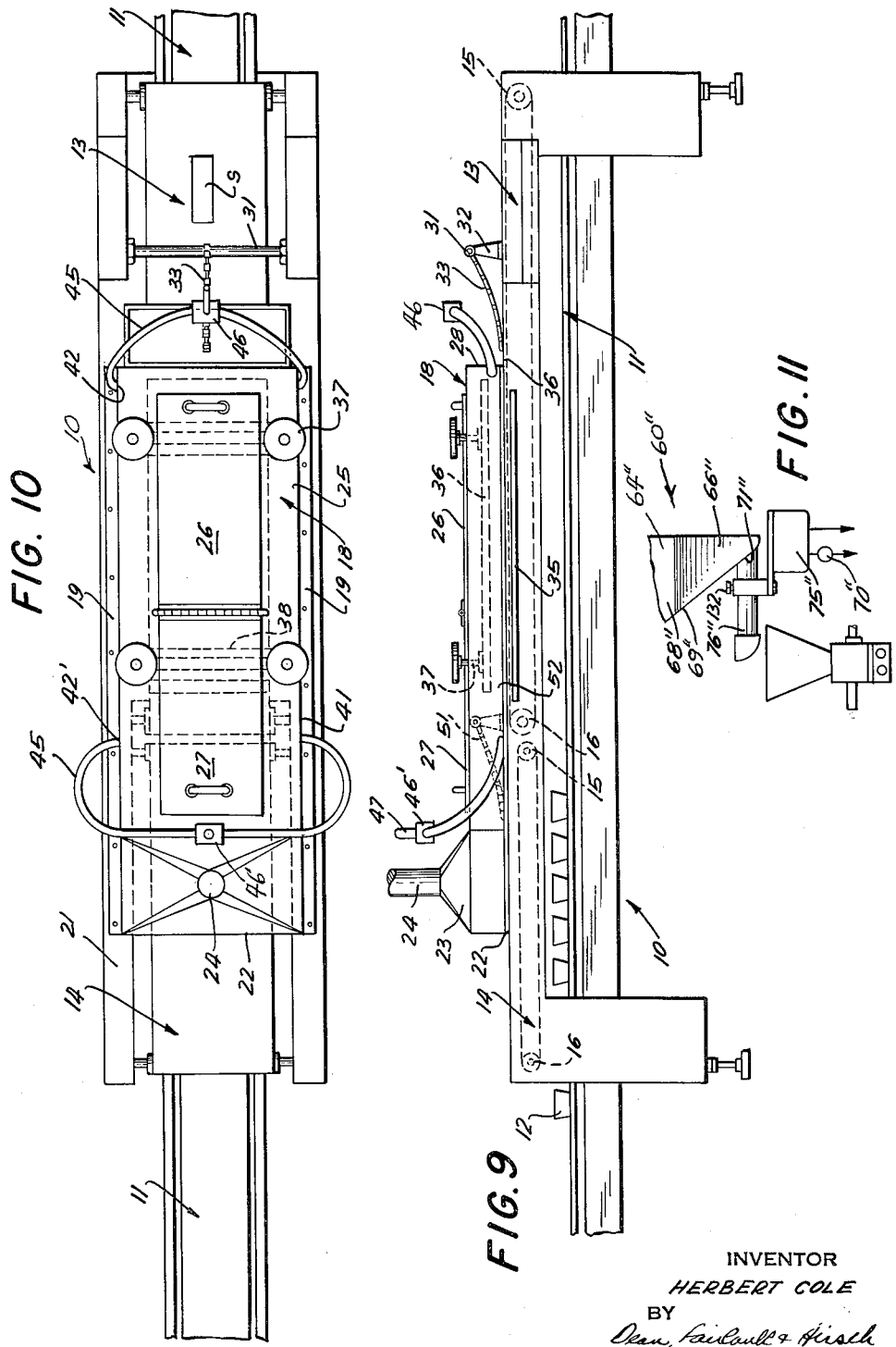

United States Patent Office 2,990,217
Patented June 27, 1961

2,990,217
DOUGH DUSTING EQUIPMENT
Herbert Cole, New York, N.Y., assignor to
Herbert Cole Trust, New York, N.Y.
Filed June 16, 1958, Ser. No. 742,343
7 Claims. (Cl. 302—56)

The present invention relates to the art of mass production of bread and cake baking and more particularly to a method and equipment that avoids the objections to conventional baking pan grease.

As conducive to an understanding of the invention, it is noted that where the baking pans used in mass production are greased in conventional manner to permit release of the bread from the pans, it has been found that:

(a) An unclean and unsanitary condition occurs unless the pans be scoured and thorougly cleaned with a frequency that is most costly in commercial practice and infestation is likely and rancidity is also incurred;

(b) New pans had to be "burned out" before being put into operation, that is, they had to be put into the oven to condition the metal and then thoroughly greased by hand for the first bake, to be certain that there were no ungreased spots, such procedure being time-consuming and requiring additional personnel with attendant relatively high costs, and before each bake the pans had to be re-greased, which, when done mechanically, required additional equipment and otherwise involved the expense of labor for perforimng the operation by hand;

(c) Since it was difficult if not impossible accurately to control the amount of grease used, the excess grease carbonized on the pans and smoked up the oven room and pan storage room producing an unsightly appearance on the walls or ceiling in addition to being discomforting to the bakers and possibly being a health hazard;

(d) The carbonization of the pans in addtition caused adhesion of the baked product thereto, so that the pans had to be replaced after but a short period of use and specks of carbonized grease would fall off the pans in nesting and some specks would be found adhering to the baked products;

(e) Even with diligent attempts to wash the pans to remove the carbon deposits, it was difficult to maintain them in a thoroughly clean and sanitary condition and the washed pans had to be treated exactly like new pans to condition them for baking which was inconvenient and added to the cost of operation;

(f) A bread crust resulted that was thick, tough, greasy, soggy and of poor color; and (g) A bread crust resulted that was porous, so that quick drying out or evaporation of moisture from the bread results, and the bread soon becomes stale, unpalatable and therefore unsaleable.

Where glazed pans are provided to permit release of the baked product, i.e., pans protected with a silicone glaze, such pans would have a longer life, but are costly and still do not avoid the need for greasing the pan at least every three or four bakings, and after a number of greasings, further expense and inconvenience is incurred because such pans must be re-glazed to maintain their usefulness. Thus, to the extent that grease is used on the glazed pans it defeats the purpose of glazing the pans, for even with the reduced amount of grease that is used, the difficulties above pointed out occur.

The glazed pans referred to, must be kept at a predetermined temperature, which requires preheating and a close control between the wet and dry bulb reading in the proof box, all of which further adds to the cost and the likelihood of derangement.

Where granular, dehydrated, hydrogenated shortening powder is used instead of grease in the baking pans, with or without an extender of starcn or flour, difficulty may be encountered, inasmuch as such material frequently will not cling uniformly to interpose a coating between the entire surface of the baked product and the pan, and the baked product will accordingly stick instead of releasing readily from the pan, with resultant objectionably spotted crust and possible rancidity. The attempt to use an excess quantity of such shortening in the effort to assure adequate coverage, results in impairment of the baked product.

It is accordingly among the objects of the invention to provide a product and process for preventing sticking of the baked product to the baking pan; which renders the baked product clean and sanitary without infestation or rancidity, and reduces to a minimum the need for scouring, washing and cleaning the pan; which renders possible the use of ordinary low priced sheet metal pans (even old pans that had been carbonized after use with grease), which pans require no glazing, reglazing or other costly time-consuming operation to render them fit for use or re-use, and by which procedure the sheet metal pan actually improves in its efficacy with use, in that a protective coating gradually accumulates thereon.

Another object is to provide a process of the above type, in which the baked product, as compared with that produced in ordinary greased baking pans, is more digestible, more inviting in color and has a thinner, tenderer, crisper and tastier crust that is dry and greaseless, lends itself more readily to slicing and has greatly reduced porosity, so that moisture is more effectively retained within the bread or other baked product, which remains fresh without drying for a much longer period, with great reduction in loss to the baker due to staleness.

According to one aspect of the invention, the grease commonly used in baking pans is replaced by a lubricant in the form of a non-toxic salt of a higher fatty acid, such as the stearate or the palmitate which is solid at room temperature. The metal component of the salt that is preferred, especially for bread baking, is magnesium, although other non-toxic low cost components such as calcium and zinc or even aluminum, barium, cadmium, cobalt, or ammonium could be used. Use of such metals as lead, copper or arsenic is to be avoided because of toxicity.

Each of the stearates and palmitates set forth is in the form of a dry, impalpable, unctuous powder at room temperature, which clings and adheres to any solid surface it contacts, so that very little is required to effect a lubricating film (in the heated oven), between the pan and the bread or cake dough to be baked therein.

Especially where magnesium stearate is used as the lubricant, a relatively thin coating applied more particularly to bread dough is much to be preferred, since it obviates the formation of an undesirable and wasteful thick crust on the baked product.

Where such magnesium stearate is sifted onto the dough piece before it is placed in the pan, or is sifted into the pan, or sifted both on the doughpiece and into the pan, it may be in such excessive quantity as to be wasteful and to necessitate frequent stoppage of the equipment for cleaning with resultant loss and inefficiency.

Where excess stearate powder escapes into the air and settles on the floor or on the equipment, there is further waste and possible respiratory disturbance to the operators.

The lubricant contemplated by the present invention including the preferred magnesium stearate despite the advantages above indicated, are subject to clogging in the hopper in which it is stored or in the feeding tube through which it is fed.

It is accordingly another object of the invention to provide a method and equipment that is simple, and not likely to become deranged, by which the dough pieces may be uniformly and adequately dusted with a relatively thin film of magnesium stearate, zinc stearate or other similar lubricant, without loss of much or any of such lubricant to the atmosphere and by the use of which the objection of flour dusting, such as swirls, cores or dust holes within the bread or bakery product and dust marks on the crust of such product are avoided.

Another object is to provide an equipment for spraying dry, ground or powdered lubricant of the above type in manner to form a cloud of distinct individual particles, which equipment is of simple and rugged construction having a minimum of moving parts, which are not likely to become deranged and which will operate without clogging and without escape of the material being sprayed into the atmosphere.

It is to be noted that as the dough pieces are fed beneath the pressure board of the conventional molder, prior to discharge into baking pans, the surfaces of the dough piece in contact with the pressure board and the conveyer belt therebeneath tend to have some of the lubricant wiped therefrom so that the dough piece may stick to the pressure board and conveyer in addition to sticking to the baking pan.

It is accordingly another object of the invention to provide a molder unit which will insure complete dusting of the entire surface of the dough piece in its passage therethrough before it is deposited in the baking pan.

This application is a continuation-in-part of copending application Serial No. 481,285, filed January 11, 1955, now abandoned. The lubricant is the subject of my copending application, Serial No. 55,864, filed September 14, 1960.

In the accompanying drawings in which is shown one or more of various possible embodiments of the several features of the invention, FIG. 1 is a diagrammatic view of a portion of a conventional make-up equipment for bread baking, FIG. 2 is a front elevational view of the duster, FIG. 3 is a detail view taken along line 3—3 of FIG. 2, FIG. 4 is a front elevational view of the powder magazine, FIG. 5 is a side elevational view of the powder magazine taken along line 5—5 of FIG. 4, FIG. 6 is a view taken along line 6—6 of FIG. 5, FIG. 7 is a detail view on an enlarged scale largely in cross section, showing the discharge tube with the vibration booster and ejector unit, FIG. 8 is a detail view of another embodiment of the vibration booster, FIG. 9 is a side elevation view of the molder, FIG. 10 is a top plan view of the molder, and FIG. 11 is a fragmentary view of another embodiment of the duster.

The lubricant, according to the present invention, is in the form of a non-toxic salt of a higher fatty acid such as the stearate or the palmitate which is solid at room temperature. The metal component of the salt that is to be preferred is magnesium, especially in the bread or roll baking art, although other non-toxic low cost components such as calcium and zinc or even aluminum, barium, cadmium, cobalt, iron or ammonium could be used. Use of such metals as lead, copper or arsenic is to be avoided because of toxicity.

Each of the stearates and palmitates set forth is in the form of a dry, impalpable, unctuous powder at room temperature, which clings and adheres to any solid surface it contacts, so that very little is required to effect a lubricating film (in the heated oven) between the pan and the dough to be baked therein.

Though the lubricant of the present invention is two or three times more costly per pound than the oil or shortening heretofore commonly used in baking pans, it is yet more economical, because the amount of lubricant of the present invention employed is but a small fraction of that of the grease, oil or shortening heretofore used. For, while the grease of the prior art bulks 16 fluid ounces to the pound, the lubricant powder of the present invention bulks to 120 to 130 or more fluid ounces to the pound with much greater coverage of surface per pound or per dollar. The modicum of lubricant thus used results in an extremely thin film under the heat in the oven, which film intervenes between the baking pan and the dough being baked therein, and so assures ready release of the baked product without sticking.

For bread baking, the amount of lubricant required is by weight, much less than one percent and preferably as little as .01 to .06 percent of the dough, depending upon the type of equipment and nature of dough. The use of more than a maximum of .06 percent is wasteful to the extent of the excess, but not otherwise objectionable, especially with magnesium stearate or palmitate. In practice, as little as .02 to .025 percent of the lubricant is preferred for bread dough of average absorption.

Magnesium stearate, calcium stearate and zinc stearate all have been found to be much more easily digested than grease, and moreover are characterized by substantial absence of odor. The same is true of the palmitates. Of course butter or other flavor might be added to the lubricant, if desired.

According to one method of carrying out the invention, the lubricant may be spread in the small amount above set forth over the inner surface of the baking pan prior to introducing the dough therein.

At the high temperature in the oven, the lubricant softens and melts, covering the entire inner surface of the pan and assures ready and quick release of the baked product from the pan. During the baking, some of the lubricant serves to seal the pores of the baked product, while the residual lubricant or the oxide, such as magnesium oxide, calcium oxide or zinc oxide, tends to form a protective coating on the pan which increases its useful life.

It is desirable, that the pan prior to delivery to the bakery, be finished with a coating of the lubricant according to the present invention, and be heated to a temperature sufficiently high (much higher than the bread baking temperature), to effect an oxide deposit upon the pan. Desirably, this pre-baked coating may be applied to the entire surface, inside and outside, of the pan, for adequate protection.

According to another method, generally preferred for baking bread, the lubricant powder above described is dusted upon the surface of the substantially completely molded dough at the last dusting operation prior to introduction of the dough into the baking pan. In such dusting, the powder is applied in the same minute proportions as above described, that is, for bread baking as little as .01 to .06 percent by weight of the dough is adequate, though the use of more than the maximum needed is still within the scope of the invention, though wasteful.

More particularly, while the processing of the dough before baking may be effected by dusting with starch as described in the copending application Serial No. 612,621, filed September 28, 1956, at each stage of the operation, such as the divider, the rounder and the proofer in bread baking for instance, in order to preclude sticking of the dough to the processing equipment, according to the present invention the final dusting operation is performed with the lubricant powder of the present invention, which acts effectively as an anti-sticking medium with respect to the equipment that immediately precedes the baking oven, that in the case of bread baking for instance, is the molder. This dusting with the lubricant is preferably applied substantially only to the outer surface of the completely molded dough pieces. It is, however, within the scope of the invention to use the lubricant powder, instead of starch for dusting at some or all the stages at which heretofore starch has been proposed or flour used for dusting the dough in the make-up equipment in the bakery.

The molder 10 diagrammatically shown in FIGS. 9 and 10 comprises a conveyor 11 which advances baking pans 12 to be successively filled with dough. Positioned above the pan conveyer 11 are longitudinally aligned dough conveyers 13, 14, each illustratively an endless belt mounted on rollers 15, 16.

Positioned over the conveyers 13 and 14 is a housing 18 which is mounted at its lateral edges 19 on side supports 21, as shown in FIG. 10. The housing at its outlet end 22 has tapering walls 23 which define a funnel that has an upstanding outlet pipe 24. The top wall 25 of the housing 18 has elongated openings with hinged covers 26 and 27 to provide access to the conveyer belts 13, 14.

Means are provided to curl the dough strips S as they are advanced by the conveyer belt 13 into the inlet 28 of housing 18. To this end, as shown in FIG. 10, a cross bar 31 is provided extending transversely across the conveyer 13 and supported in upright standards 32 so as to straddle said conveyer. The cross bar mounts one end of a drag chain 33 which is in the path of movement of the rectangular dough strips S advanced by said conveyer 13. In conventional manner the drag chain will cause each of the successive dough pieces to curl to form a roll as it enters the inlet 28 of the housing 18.

Means are provided to effect pressure on the curled or rolled dough pieces as they are advanced through the housing 18. To this end, as shown in FIG. 9, a rectangular plate 35 is rigidly supported beneath the upper run 36 of conveyer 13. Positioned above the conveyer 13 in vertical alignment with plate 35 is a vertically movable rectangular plate 36 which is supported at its corners by screws 37 rising through threaded openings in the top wall 25 of the housing, said screws having an operating wheel at each of their upper ends, transversely aligned pairs of screws being ganged together as at 38 so that rotation of one of the screws will rotate the other screw a corresponding amount.

Thus, depending upon the setting of plate 36 by screws 37, the amount of compression of the curled dough pieces may be set as desired.

Means are provided to dust the dough pieces. To this end, as shown in FIGS. 9 and 10, each of the side walls 41 of the housing 18 adjacent the inlet 28 thereof and also inwardly of the funnel 23 has a port 42, 42′ to the inner side of which a spray nozzle (not shown) is connected, each of said nozzles being connected by an associated line 45 to a T-fitting 46, 46′, respectively.

In order to insure that each of the curled and compressed dough pieces will have its entire surface covered by the lubricant blown into the housing through the ports 42, 42′, a second drag chain 51 is provided adjacent the discharge end 52 of the compression plates 35, 36, said chain being supported in the same manner as drag chain 33.

In order to provide a dependable supply of the lubricant to the molder 10, the duster unit 60 shown in FIGS. 2 to 7 is desirably provided, which may comprise a substantially box-like housing 61 suitably mounted in upright position as by legs 62.

Mounted on the front panel 63 of the housing 61 and extending outwardly therefrom is a powder reservoir or hopper 64, the mouth of which has a hinged cover 65. The lower ends 66 of the front and back walls 67 of the hopper and the lower portion 68 of side wall 69 thereof taper inwardly to define substantially a funnel to facilitate discharge of powder through the lateral port 71 in the lower end of vertical side wall 72.

In order to insure dependable flow of the lubricant which is in powder form, from the hopper 64 through the port 71, a vibrator unit 75 is provided, preferably affixed to the portion 68 of said side wall 69, said vibrator being controlled as by rheostat 70.

Affixed at one end in outlet port 71 and extending horizontally therefrom is a powder discharge tube 76, the free end of which mounts a baffle member 77. As shown in FIG. 7, the baffle member is cylindrical at one end as at 78, so that it may snugly encompass the free end of tube 76, the latter abutting at its lower edge against a lip 79 extending transversely across the baffle member. The lower portion of the baffle member is open as at 81 to define a mouth through which will fall the powder passing over the lip 79.

Although the lubricant powder will flow into tube 76 from the hopper 64 due to the action of vibrator unit 75 it will tend to clog due to the stickiness of such stearate in the tube 76 and rapidly fill the latter to prevent discharge therefrom. In order to prevent such clogging of the stearate in tube 76, so as to ensure its even discharge therefrom, a vibratory booster is desirably associated with said tube 76.

In the embodiment shown in FIG. 7, the vibratory booster comprises a rod 83, one end 84 of which is bent at right angles, preferably downwardly and secured in any suitable manner to the tube 76 adjacent the outer end thereof. The main portion of the rod 83 extends rearwardly through the tube, through the port 71 into the lower end of the hopper 64 and then extends upwardly as at 85 at substantially right angles to the main portion of the rod 83.

The mouth of baffle member 77 is positioned directly over the mouth 92 of a funnel 93, the lower end 94 of which is secured in the upper portion of a substantially cylindrical recess 95 in an ejector member 96. As shown in FIG. 7, the ejector member comprises a block 97 secured to a bracket 98 mounted on front panel 63 of the housing 61. The block 97 has transversely aligned bores 99, 100 in communication with the lower portion of the recess 95, the bore 100 having a nipple 101 associated therewith to which one end of a pressure line 102 may be connected, the latter being connected to T-fitting 49.

Mounted in bore 99 and extending into the recess 95 is a nozzle 103, the outer end 104 of which is connected by line 105 through pressure regulator 106, solenoid valve 107 and line 108 to the end of a dehydrator unit 109, the lower end of the unit 109 being connected through valve 111, pressure regulator 112 and filter 113 to a source of air under pressure at 114.

The housing 61 contains a suction device (not shown) connected to suction line 115 which is connected to pipe 24 of the molder 10 and the suction device through conventional filters (not shown) discharges powder drawn through line 115 in the manner hereinafter described, into a collector 116 which may be positioned beneath the housing 61.

The system preferably employs at least two duster units 60 and 60′, as shown in FIG. 1, the unit 60 having its pressure line 102 connected to T-fitting 46 and the unit 60′ having its pressure line 102 connected to T-fitting 46′, the suction line 115 of only duster 60 being connected to pipe 24.

In the operation of the system, the vibrator 75 is energized, the amount of vibration and hence rate of feed being determined by the setting of the associated rheostat 70; the source of air under pressure is applied to air inlet 114 and the source of suction is applied to line 115.

As a result of the vibration imparted to the hopper 64 by the vibrator unit 75, the stearate powder contained in the hopper will be discharged through port 71 along the length of pipe 76. Due to the stickiness of the stearate, it would tend to clog in the pipe 76 except for the presence of the vibration booster 83. Thus the vibration imparted to the hopper 64 by unit 75 also imparts some vibration to the pipe 76 which by itself would not be sufficient to prevent clogging. However, by reason of the booster or rod 83 which tends to vibrate more or less violently due to the vibration of the pipe 76 and hopper 64, the powder in the pipe will be broken up so that it will flow freely toward the discharge end thereof.

The powder in the pipe 76 will pile up inwardly of the lip 79 so that the powder will drop at a relatively slow rate over such lip into the funnel 93 therebeneath.

As the powder falls into the funnel 93 it will be forced through outlet port 100 by the action of the air jet from nozzle 97. By reason of such air jet, a venturi action will be created which will suck the ambient air into the outlet port through the funnel 93, thereby preventing a cloud of powder forming above the funnel and providing additional air in the stream of powder and air flowing through outlet port 100 and line 102 for enhanced dispersion of the powder.

Although the stream of powder and air may be used during any portion of the make-up operation, it is always applied to the molder, as illustratively shown.

Thus, the stream of air and powder will be forced through lines 102, 102' and 45 and through the ports 42 and 42' in the housing 18 and when the stream of powder and air leave the ports, by reason of the expansion of the air, a cloud will be formed filling the housing 18 with relatively small finely divided particles of stearate powder.

In practice, the dry air which delivers powder to the housing 18 is fed at rate in the order of 15 cubic feet per minute while the suction means in the housing 18 will draw at the rate in the order of 300 cubic feet per minute. Thus, the stearate powder particles that do not adhere to the dough pieces will be sucked from the interior of such housing along with ambient air so that there is no likelihood of dust escaping into the room, yet the suction will in no wise interfere with the effective and thorough dust coating of the dough pieces.

As the sheets of dough are successively advanced by conveyer 13, FIGS. 9 and 10, the leading edge of each piece will abut against the curling chain 33 which in conventional manner will form a loose roll from each sheet.

As the ports 42 are adjacent the inlet 28, to the housing 18, there is assurance that the curled dough pieces will be thoroughly dusted as they are advanced beneath the plate 36 so that they will not adhere thereto. As the conveyer belt is continuously advancing, the curled dough piece will be compressed between the plate 36 and the plate 35 beneath the conveyer belt 13 and also rolled along until it is discharged from the discharge end 52 of the compression plates 35, 36. Thereupon, the conveyer 14 will further advance the compressed curled dough piece until it abuts against the chain 51. This chain will momentarily stop advance of the curled dough piece which, however, will again rotate by reason of the advancing conveyer 13 and as the ports 42' are adjacent the chain 51 there is assurance that the entire surface of the compressed curled dough piece will be effectively coated with lubricant.

Thereupon, when the next succeeding dough piece reaches the belt it will force the previously coated dough piece therepast to be further advanced by the conveyer belt 14 which will discharge the thoroughly dusted dough pieces into an associated baking pan 12 simultaneously advanced by the conveyer 11 and positioned below conveyer 14.

In FIG. 8 is shown another embodiment of a vibration booster which may comprise a metal strip which has a portion 121 encompassing the pipe 76' and clamped in place as at 122. The strip has an upstanding portion 123 and a horizontal portion or arm 124 which extends toward the outlet end of the pipe.

Thus, upon transmission of vibrations to the pipe 76' by the vibrator unit 75, the arm 124 will vibrate at an enhanced rate which in turn will cause further vibration of the pipe 76' to prevent clogging of the stearate therein.

Although the vibration boosters above described were found necessary to provide for free flow of the stearate through the discharge tube, after considerable development work it was found that such free flow could also be accomplished by re-positioning the outlet tube and the vibrator unit.

Thus referring to the embodiment shown in FIG. 11 in which parts corresponding to those in FIGS. 2 to 7 have the same reference numerals double primed, the duster unit 60" is substantially identical to that shown in FIG. 2, except that the lateral outlet port 71" is located in the bottom end of the tapering lower portion 68" of side wall 69" of the hopper and one end of the discharge tube 76" is affixed in said port 71" and extends outwardly therefrom and the vibrator unit 75 is replaced by a like vibrator unit 75" secured to the discharge tube 76".

To this end, a collar 131 encompasses tube 76" and is adjustably secured thereto as by set screw 132, affixed to said collar 131 is the vibrator unit 75", controlled by a rheostat 70", the position of the vibrator 75" with respect to the tube 76" determining the rate of flow of powder from the hopper 64".

With the arrangement above described, it has been found that the stearate powder will discharge readily through the outlet port 71" and by reason of the vibration imparted to such tube by vibrator 75" will flow therethrough without clogging.

With the dusting equipment above described, a continuous feed of stearate may be obtained without likelihood of clogging of the discharge pipe and highly effective particle separation may be obtained for dusting of the dough pieces.

With the lubricant above described, and the method and equipment for applying the same, the lubricant, aside from its function as the dusting agent at the molder, performs the further function thereafter in the baking pan of preventing sticking of the baked product with respect to the pan and assures easy and prompt release after baking.

The product that results from the use of the lubricant according to the present invention, has the advantage of greater digestability, an inviting color, with a thinner, crispier and tastier, dry and greaseless crust and reduced porosity of crust which retards evaporation of moisture and reduces the severe loss suffered by the baker through stale bread. Indeed, four or five days after baking, according to the procedure of the present invention, the bread is less stale than it is on the second day after baking in a conventionally greased pan.

As many changes could be made in the above equipment, product and process, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. Dusting equipment comprising a powder reservoir, a discharge tube, said discharge tube extending laterally through an aperture near the lower end of its side wall, an ejector unit positioned below the free end of said tube, said ejector unit comprising a member having a recess therein vertically aligned with the free end of said tube, a nozzle extending transversely into said recess, said recess having a transversely extending outlet port, agitator means to cause discharge of powder from said reservoir through said tube to drop into said recess between the nozzle and the outlet, said agitator means consisting of a vibrator unit mounted on said reservoir and a vibration booster unit mounted on said tube.

2. The combination set forth in claim 1 in which said vibration booster comprises a rod having a portion affixed to said tube adjacent its free end and a horizontal portion extending from said first portion toward the other end of said tube.

3. The combination set forth in claim 1 in which said vibration booster comprises a rod having a portion affixed to said tube adjacent its free end and a horizontal portion extending from said first portion toward the other end of said tube, said horizontal portion having its innter end extending into the outlet of said reservoir and a vertical portion rising from said inner end.

4. The combination set forth in claim 1 in which said vibration booster comprises a member affixed at one end to said tube and having a portion extending parallel to the length of said tube and spaced therefrom.

5. The combination set forth in claim 1 in which said vibration booster comprises a member affixed at one end to said tube adjacent the rear end thereof and rising therefrom, said member having a horizontal portion rigid therewith and extending parallel to said tube toward the free end thereof and spaced from said tube.

6. The combination set forth in claim 1 in which a rheostat is provided to control said vibrator unit.

7. Dusting equipment comprising a box-like chamber defining a powder reservoir, said chamber having one of its wall surfaces tapering inwardly toward the lower end thereof, and the opposite wall thereof extending substantially vertically, said lower end having an outlet at said latter wall, a discharge tube extending laterally outward from said outlet, an ejector unit positioned below the free end of said tube, said ejector unit comprising a member having a recess therein vertically aligned with the free end of said tube, a nozzle extending transversely into said recess, said recess having a transversely extending outlet port, and agitator means to cause discharge of powder from said reservoir through said tube into said recess between the nozzle and the outlet, said agitator means consisting of a vibrator unit mounted on said reservoir, and a vibrator booster unit mounted on said tube.

References Cited in the file of this patent

UNITED STATES PATENTS

| | | |
|---|---|---|
| 262,888 | Butler et al. | Aug. 15, 1882 |
| 1,483,704 | Wilcox | Feb. 12, 1924 |
| 1,558,440 | Weber | Oct. 20, 1925 |
| 1,582,382 | Collis | Apr. 27, 1926 |
| 1,752,309 | Rosenbaum | Apr. 1, 1930 |
| 1,797,183 | Wetmore | Mar. 17, 1931 |
| 2,164,483 | Watson et al. | July 4, 1939 |
| 2,195,424 | Raiche | Apr. 2, 1940 |
| 2,440,655 | Hahn | Apr. 27, 1948 |
| 2,549,033 | Tyrner | Apr. 17, 1951 |
| 2,724,526 | Russell et al. | Nov. 22, 1955 |
| 2,738,897 | Russell et al. | Mar. 20, 1956 |